No. 758,011. PATENTED APR. 19, 1904.
C. KUHLEWIND.
VALVE GOVERNOR FOR ENGINES.
APPLICATION FILED JULY 10, 1903.
NO MODEL. 3 SHEETS—SHEET 1.

WITNESSES

INVENTOR
Cornelius Kuhlewind

No. 758,011. PATENTED APR. 19, 1904.
C. KUHLEWIND.
VALVE GOVERNOR FOR ENGINES.
APPLICATION FILED JULY 10, 1903.
NO MODEL. 3 SHEETS—SHEET 3.

WITNESSES

INVENTOR
Cornelius Kuhlewind
by Bakewell & Byrnes
his attys

No. 758,011.

Patented April 19, 1904.

UNITED STATES PATENT OFFICE.

CORNELIUS KUHLEWIND, OF KNOXVILLE, PENNSYLVANIA, ASSIGNOR TO KUHLEWIND GOVERNOR COMPANY, OF PITTSBURG, PENNSYLVANIA, A CORPORATION OF PENNSYLVANIA.

VALVE-GOVERNOR FOR ENGINES.

SPECIFICATION forming part of Letters Patent No. 758,011, dated April 19, 1904.

Application filed July 10, 1903. Serial No. 165,024. (No model.)

*To all whom it may concern:*

Be it known that I, CORNELIUS KUHLEWIND, of Knoxville, Allegheny county, Pennsylvania, have invented a new and useful Engine-Governor, of which the following is a full, clear, and exact description, reference being had to the accompanying drawings, forming part of this specification, in which—

Figure 1:
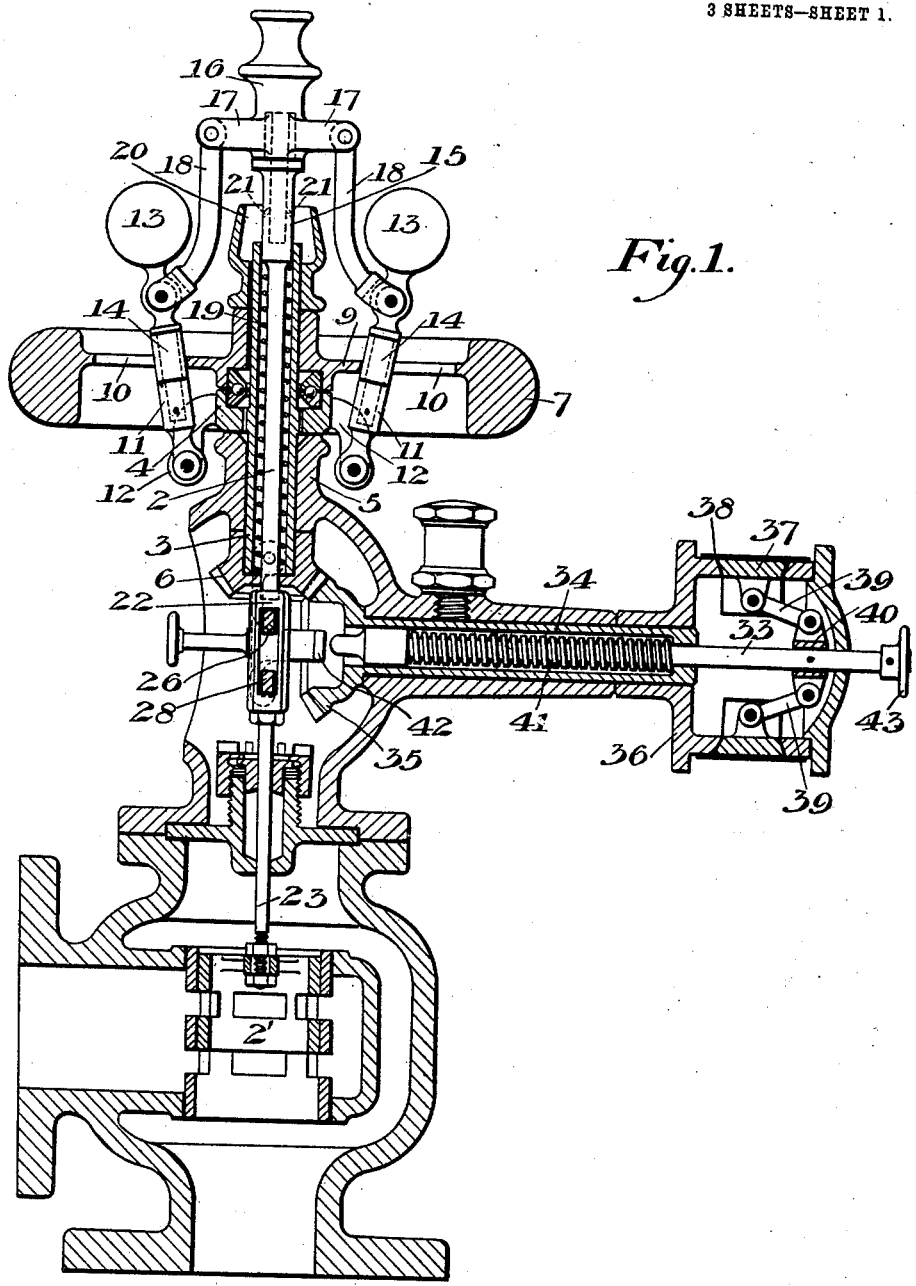
Figure 2:
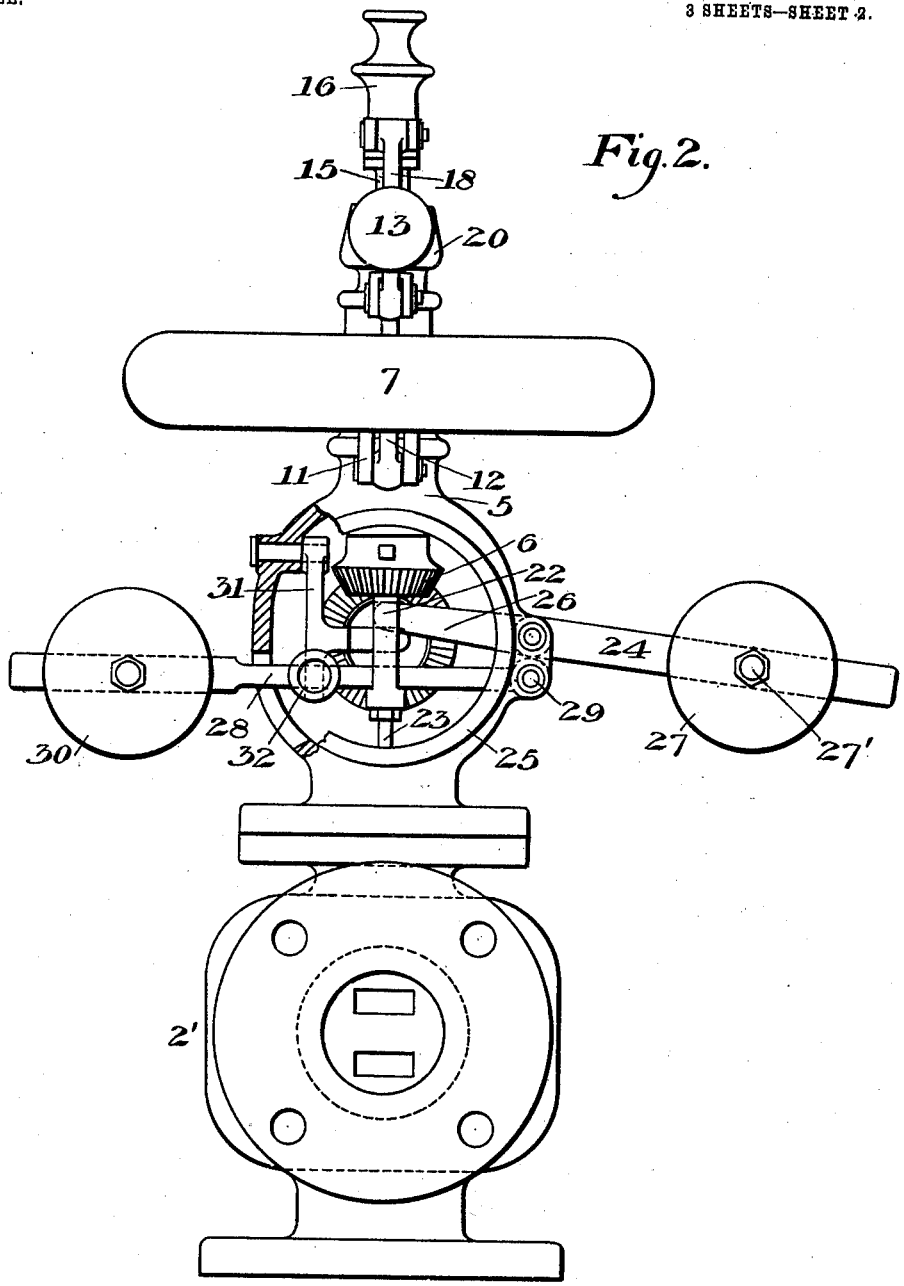
Figure 3:
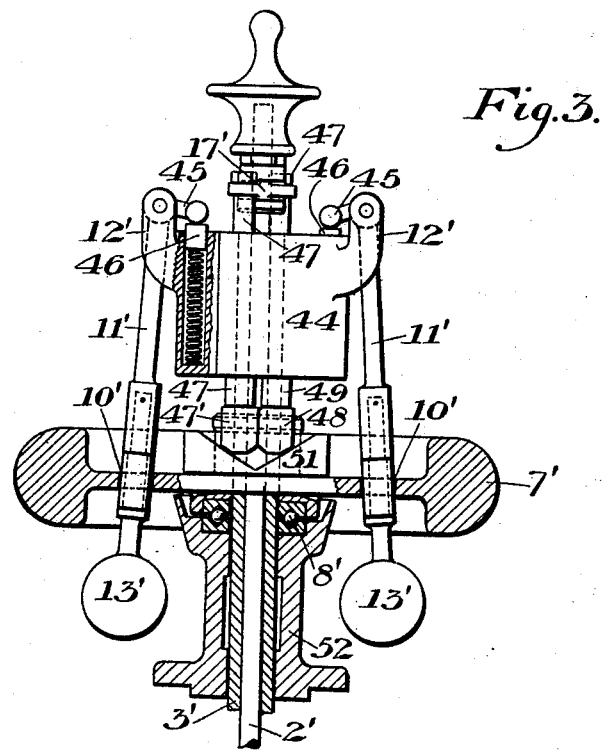
Figure 4:
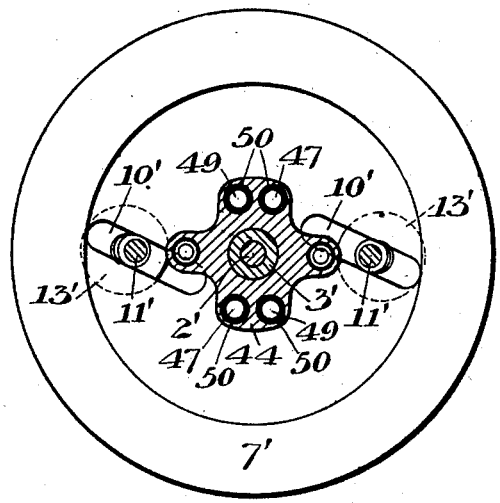

Figure 1 is a sectional side elevation showing one form of my improved governor. Fig. 2 is a front elevation of the form of Fig. 1. Fig. 3 is a partial vertical section of another form of the invention, and Fig. 4 is a cross-section of the form of Fig. 3.

My invention relates to the class of engine-governors, and is designed to provide a sensitive and quick-acting governor which will act upon the valve and vary the area of the fluid-admission port or ports, according to the load on the engine.

In the drawings, referring to the form of Figs. 1 and 2, 2 represents the stem of a throttle-valve 2' of the ordinary hollow piston type. The stem of this valve extends upwardly through a suitable packing device in the top of the valve-chamber, and thence through a tubular shaft 3, which shaft has a ring or collar 4 rigidly secured thereto and resting on a supporting-bearing 5. A bevel-wheel 6 is rigidly secured to the lower end of the shaft, this wheel having a central hole through which the valve-stem loosely extends and being actuated by bevel-gear connection with a shaft having a pulley driven by the engine.

A fly-wheel 7 loosely surrounds the tubular shaft 3 and is carried on ball-bearings 8, resting upon the ring 4, secured to the shaft 3. The fly-wheel is preferably of disk form, with a web portion 9, having angular slots 10 of the form shown in Fig. 4. Through these slots extend links 11 11, which are pivoted at their lower ends to brackets 12 12, projecting from the collar 4. These links are provided at their upper ends with small balls 13 and are also preferably provided with intermediate friction-rollers 14, which bear on the sides of the slots in the fly-wheel.

The upper portion of the valve-rod 2 is enlarged, as shown at 15, this enlarged portion fitting neatly within the upper part of the tubular shaft 3 and terminating in a head 16, which is provided with brackets 17, connected by curved links 18 with the links 14. A spiral spring 19 surrounds the valve-rod 2 within the hollow shaft 3, this spring bearing at its lower end on the bevel-wheel, while at its upper end it presses upon the shoulder formed by the enlarged portion of the valve-rod. The spring therefore exerts a constant lifting pressure on the valve-rod, which tends to open the valve and draw in the balls 13.

I have shown an annular lubricating-cup 20, surrounding the tubular shaft and arranged to contain oil which feeds down to the ball-bearings for the fly-wheel, and to supply oil to this cup I preferably make the head hollow, so that it may be filled during operation, the oil passing into the cup 20 through branch outlets 21 in the cavity of the upper valve-stem.

The slots in the fly-wheel are arranged at such an angle that as the balls 13 move outwardly under the centrifugal force during running they tend to turn the fly-wheel, and correspondingly the inertia effect of the fly-wheel will act upon the ball-links when there is any change in speed, and thereby move the links in or out and shift the valve. When the device is in operation, the centrifugal effort of the balls acts against the spring surrounding the valve-stem, and the stem is balanced in any position by these two opposing forces.

On any change in speed the speed of the bevel-wheel will be changed and this in turn will tend to slow down the fly-wheel, which is turned by the action of the ball-link. The fly-wheel resists this tendency on account of its inertia, and the effect is to give a quick shift of the valve to open or close it, and thus vary the steam-supply. The combined action of the parts is therefore to hold the speed at a certain predetermined point. The speed in this case will be determined by the spring, the pressure of which may be varied.

In order to provide for quick stopping of the engine either by hand or automatically if the belt leaves the pulley, I preferably cut the valve-stem transversely at the point marked 22. The lower part 23 of the valve-stem, which is secured to the valve, butts against the upper part 2 and is normally held against it by a weighted lever 24, pivoted in a hollow frame 25 and having its end 26 entering a slot in the lower valve-stem portion 23. The weight 27 on this lever is adjustable along it and is secured at any desired point by a set-screw 27'. This weight exerts a lifting tendency on the valve-stem which normally keeps the two parts of this stem in contact, and it coacts with the spring in exerting a lifting effect on the valve. The speed of the engine may be varied by shifting the weight along the lever.

A second lever 28 extends through the slot in the stem portion 23 and is fulcrumed on the opposite side at 29. The weight 30 of this lever acts to force down the lower valve-stem portion and separate it from the upper portion 2. The lever 28 is normally held in raised position by a catch-lever 31, having a handle 32. This catch-lever projects under the lever 28 and normally supports it, so that the two valve-stem portions are pressed together, enabling the upper valve-stem portions to actuate the valve. The slot through which the lever 28 passes is elongated vertically a sufficient distance to allow for all ordinary variations or movements of the stem; but when the hand-lever is tripped the lever will drop and force the lower valve-stem part down, thus disconnecting and closing the valve.

In order to provide for automatically stopping the engine whenever the belt runs off the governor-pulley, I provide a push-rod 33, extending through the hollow driving-shaft 34 and carrying the bevel-wheel 35 and the driving-pulley 36. The driving portion of this pulley is formed of two blocks 37, secured to a circular spring-band 38, with which the belt contacts. The blocks 37 are connected by short links 39 with a sliding sleeve 40, pinned to the push-rod. A spiral spring 41 surrounds the push-rod and tends to force it forward, this tendency being resisted by the pressure of the belt on the spring-band. Whenever the belt is removed, the spring 41 will force the push-rod forward, and its end will strike a curved prong 42 on the catch-lever and force it from under the weighted lever 28, which will drop and stop the engine. In order to contract the spring rind or band around the pulley when applying the belt, I provide a disk 43 upon the end of the push-rod, by which it may be moved endwise.

Whenever it is desired to suddenly stop the engine, the operator will strike the catch-lever and trip the weighted lever 28, thus closing the valve, and whenever the band runs off the driving-pulley the lever 28 will be automatically tripped and shut down the engine.

In Figs. 3 and 4 I show another form of the governor in which the ball-links extend downwardly. In this form the valve-rod 2' extends up through the tubular shaft 3', which shaft extends upwardly through the fly-wheel 7' and carries a casting or cross-head 44, having brackets 12', to which are pivoted the depending ball-links 11', extending through the slots 10' of the fly-wheel and carrying the balls 13 at their lower end. The ball-links in this case are provided with short lever-arms 45, which bear upon spring-pressed plungers 46, mounted in suitable recesses in the cross-head. The valve-stem 2' is provided at its upper end with a cross-head 17', which extends transversely of the cross-head 44 and carries depending rods 47, which extend down through the cross-head 44 and are provided at their lower ends with beveled blocks 47'. These rods 47 are diagonally opposite to each other, and the bevel-block of each rod coacts with a similar bevel-block 48 on a sliding pin 49, which is carried within the cross-head 44. Springs 50 within the cross-head force the rods and bevel-blocks downwardly into contact with the oppositely-directed inclines of a recess in a block 51, secured to the fly-wheel. The valve-rod and tubular shaft extend through this block 51, and the fly-wheel is carried upon ball-bearings resting on a stationary bearing 52. In the operation of this form in starting the engine one of each pair of wedge-blocks will be in upper position and its mate in lower position. As the fluid-supply is opened the engine will rotate the tubular shaft, as before, and as the engine speeds up the balls will swing outwardly under centrifugal force, and the bevel-blocks will assume an intermediate position, as shown in Fig. 3. The coaction of the slot-walls of the fly-wheel and the ball-links will be the same as in the first form. When any variation of speed occurs, the wedge-blocks will change position and the valve will be shifted.

The advantages of my invention result from the extreme sensitiveness and quick action of the governor, which in actual practice is found to operate accurately and efficiently. It effectually prevents the engine from running away and holds it to the desired speed even under great and sudden changes of load. The application of this governor to ordinary slide-valve engines makes it practically as efficient and economical as an automatic engine. The automatic pulling device prevents running away of the engine when the belt leaves the pulley.

Many changes may be made in the connections or bearing between the ball-carriers and the fly-wheel, as well as in the valve, the valve connections, and the other parts without departing from my invention.

I claim—

1. An engine-governor comprising a rotary momentum-disk, a rotary element, driving connections between one of said parts and a moving part of the engine, a supply-valve connected to one of said parts, and a cam connection between the momentum-disk and the rotating element arranged to shift the position of the valve; substantially as described.

2. An engine-governor comprising a rotary momentum-disk held in a fixed position relative to vertical movement, a rotary element, a supply-valve connected to one of said parts, and a connection between the momentum-disk and the rotary element arranged to shift the position of the valve; substantially as described.

3. An engine-governor comprising a rotary momentum-disk held against vertical movement, a rotary element, a supply-valve connected to one of said parts, driving connections between one of said parts and a moving part of the engine, and a cam connection between the momentum-disk and the rotary element; substantially as described.

4. An engine-governor comprising a rotary momentum-disk, a rotary element having centrifugal balls mounted thereon, driving connections between the rotary element and a moving part of the engine, a supply-valve connected to one of said parts, (the momentum-disk and rotary element,) and a cam connection between the momentum-disk and the ball-carriers; substantially as described.

5. An engine-governor comprising a rotary momentum-disk, a rotary element having centrifugal balls and connected to a two-part valve-stem, means for normally holding the two-part valve-stem with the ends abutting together, and a cam connection between the rotary elements and the momentum-disk; substantially as described.

6. An engine-governor comprising a rotary momentum-disk, a rotary element having centrifugal balls and connected to a two-part valve-stem, means for normally holding the two-part valve-stem with the ends abutting together, a cam connection between the rotary elements and the momentum-disk, and means for severing the connection between the two parts of the valve-stem; substantially as described.

7. An engine-governor having a driving-pulley with a yielding rim, connections between said rim and the valve-stem, and a spring arranged to actuate said connection and sever the connection between the valve-stem and the governor whenever the belt leaves the driving-pulley; substantially as described.

8. An engine-governor having a two-part valve-stem with the two parts in alinement, a yielding weight or spring device arranged to hold the ends of the valve-stem in butting engagement, and means for moving one part of the valve-stem away from the other part; substantially as described.

9. An engine-governor having a rotary momentum-disk with a cam-slot therein, a rotary element connected to the valve-stem and having balls carried upon links extending through the cam-slots of the momentum-disk, and connections between the rotary element and a moving part of the engine; substantially as described.

10. An engine-governor having a two-part valve-stem with the two parts in alinement, yielding means for holding the two parts of the stem in engagement, and a hand knock-off device arranged to quickly sever the connection between the two parts of the stem, and thereby close the valve; substantially as described.

In testimony whereof I have hereunto set my hand.

CORNELIUS KUHLEWIND.

Wttnesses:
GEO. B. BLEMING,
H. M. CORWIN.